(12) United States Patent
Bisson

(10) Patent No.: US 10,571,236 B2
(45) Date of Patent: Feb. 25, 2020

(54) DUAL PURPOSE DATUM DEVICE

(71) Applicant: NYX, Inc., Livonia, MI (US)

(72) Inventor: Jeffrey Michael Bisson, Amherstberg (CA)

(73) Assignee: NYX, Inc., Livonia, MI (US)

( * ) Notice: Subject to any disclaimer, the term of this patent is extended or adjusted under 35 U.S.C. 154(b) by 338 days.

(21) Appl. No.: 15/472,468

(22) Filed: Mar. 29, 2017

(65) Prior Publication Data

US 2017/0284783 A1 Oct. 5, 2017

Related U.S. Application Data

(60) Provisional application No. 62/314,513, filed on Mar. 29, 2016.

(51) Int. Cl.
*G01B 3/50* (2006.01)

(52) U.S. Cl.
CPC ..................... *G01B 3/50* (2013.01)

(58) Field of Classification Search
CPC ....................................................... G01B 3/50
USPC ................. 33/544.6, 545, 549–552
See application file for complete search history.

(56) References Cited

U.S. PATENT DOCUMENTS

| | | | | |
|---|---|---|---|---|
| 5,774,997 A * | 7/1998 | Gruen, Jr. | ............... | G01B 5/22 206/315.9 |
| 6,314,655 B1 * | 11/2001 | Quintavalla | ......... | G01B 5/0023 33/549 |
| 6,408,532 B1 * | 6/2002 | Keys | ....................... | G01B 5/02 33/199 R |
| 6,508,009 B1 * | 1/2003 | Tubis | ..................... | G01B 5/207 33/549 |
| 6,578,281 B2 * | 6/2003 | Takahashi | ............ | A63B 47/008 33/509 |
| 7,571,545 B2 * | 8/2009 | Nauche | ..................... | G01B 5/20 33/200 |
| 7,690,130 B1 * | 4/2010 | Risinger | .................. | G01B 3/22 33/549 |
| 2013/0219731 A1 * | 8/2013 | Zhang | .................... | G01B 5/252 33/550 |
| 2017/0284783 A1 * | 10/2017 | Bisson | ..................... | G01B 3/50 |

* cited by examiner

*Primary Examiner* — Yaritza Guadalupe-McCall
(74) *Attorney, Agent, or Firm* — Carlson, Gaskey & Olds, P.C.

(57) ABSTRACT

A locator mechanism for checking dimensions of a component includes a stationary base that has sides that define a pocket that opens upwards. A locator block is disposed in, and moveable in, the pocket. At least one spring biases the locator block toward one of the sides of the stationary base. The locator block carries either a recess or a portion of a pin for engaging, respectively, either a boss or a hole of a component to be checked. The spring biases the locator block, and thus also the component, toward the one side of the stationary base to remove play in positioning of the component.

18 Claims, 3 Drawing Sheets

DUAL PURPOSE DATUM DEVICE

CROSS-REFERENCE TO RELATED APPLICATION

The present disclosure claims priority to U.S. Provisional Patent Application No. 62/314,513, filed Mar. 29, 2016.

BACKGROUND

Components such as plastic molded parts often have protruding bosses or holes, which may be used for attachment in a larger assembly. The bosses or holes often have a Maximum Material Condition (MMC) and Least Material Condition (LMC). The MMC is the condition in which the part feature has the maximum amount of material and is thus largest in size. The LMC is the condition in which the part feature has the minimum amount of material and is thus smallest in size. MMC and LMC are often checked as a matter of quality assurance.

The components are also subjected to other overall dimensional measurements. In such measurements, the bosses or holes are used as reference locating features that engage a datum device that has an appropriate mating MMC or LMC feature.

SUMMARY

An example locator mechanism according to an example of the present disclosure includes a stationary base that has sides that define a pocket that opens upwards. A locator block is disposed in, and moveable in, the pocket. At least one spring biases the locator block toward one of the sides of the stationary base. The locator block carries either a recess or a portion of a pin for engaging, respectively, either a boss or a hole of a component to be checked. The spring biases the locator block, and thus also the component, toward the one side of the stationary base to remove play in positioning of the component.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
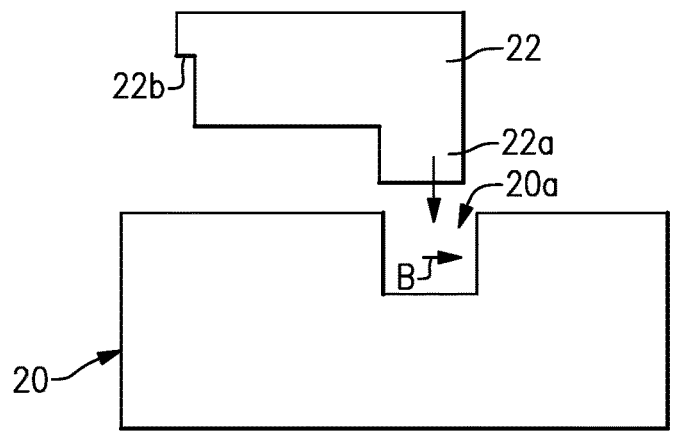
FIG. 1 illustrates an example of a dual purpose locator mechanism.

FIG. 1 schematically illustrates an example dual purpose locator mechanism 20 (i.e. datum device) for checking dimensions of a component 22. For instance, the locator mechanism 20 can be used to verify that a boss 22a of the component 22 is within its Maximum Material Condition (MMC). The boss 22a is received into a component-receiving pocket 20a of the locator mechanism 20. The component-receiving pocket 20a is sized at the MMC such that the boss 22a does not fit into the component-receiving pocket 20a is the boss 22a is over-sized. If within size, the boss 22a fits into the pocket 20a. If the boss 22a is substantially below the MMC, there would normally be play in the precise position of the component, which then adds variation to measurements on other locations of the component, such as at feature 22b. In this regard however, the locator mechanism 20 biases the component 22, as represented at B, toward one side of the component-receiving pocket 20a to reduce play and thereby enhance measurement repeatability.

As will be described in the following examples, the locator mechanism may be configured to receive a boss on the component or, inversely, a hole on the component, and may be configured to limit movement of the component in two directions or in four directions.

Figure 2A:
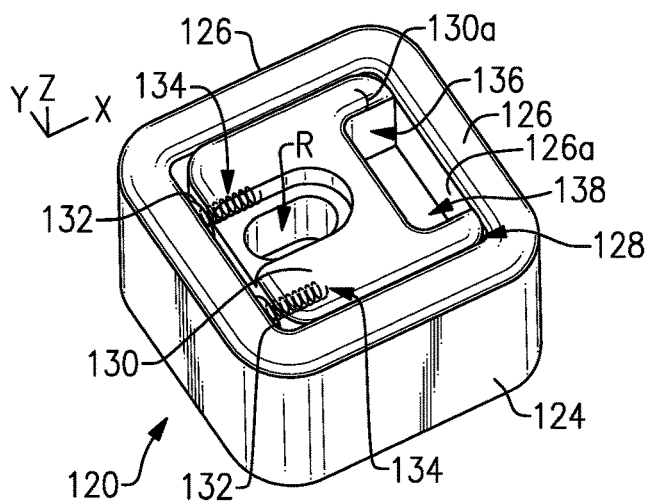
FIGS. 2A and 2B illustrate an example two-way locator mechanism.
Figure 2B:
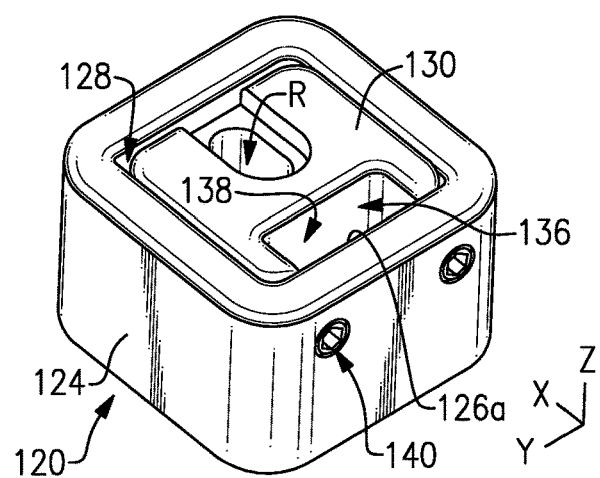

FIGS. 2A and 2B illustrate views of an example locator mechanism 120 that is configured to receive a boss and limits movement in two directions. The locator mechanism 120 includes a stationary base 124 that has sides 126 or sidewalls (four in this example) that define a pocket 128 that opens upwards. A locator block 130 is disposed in, and is moveable in, the pocket 128. The locator block 130 may be moveably retained in the stationary base 124 via a retaining bolt received through a corresponding slot opening R in the locator block 130 and stationary base 124. In this example, the locator block 130 includes two spring pockets 132 (e.g. bores) that retain respective springs 134. The springs 134 bias the locator block 130 toward side 126a of the stationary base 124.

The locator block 130 carries a recess 136 that opens toward the side 126a of the stationary base 124. Together, the recess 136 and the side 126a form a component-receiving pocket 138 for receiving the boss 22a, for example. The component-receiving pocket 138 has a maximum size that corresponds to the MMC, such that if the boss 22a does not fit into the pocket 138, the non-fit condition indicates non-conformity with the MMC.

In use, the boss 22a is inserted into the component-receiving pocket 138. If the boss 22a does not exceed the MMC and is able to fit into the pocket 138, the springs 134 bias the locator block 130 and thus also the component toward the side 126a of the stationary base 124 to reduce or eliminate play in the position of the component for more precise overall part measurement. In this example, the locator mechanism 120 limits movement in two directions (along the x-axis). The recess 136 is elongated (in the y-axis directions) and thus permits movement in that direction.

As shown, the locator mechanism 120 also include one or more locks 140. The lock 140 serves to retain the locator block 130 in a retracted position, against the bias force of the spring 134. In this example, the lock 140 is a set screw that extends through a threaded opening in one of the sides 126 of the stationary base 124. Rotation of the screw causes the screw to protrude into the pocket 128 and contact the locator block 130. Further rotation pushes the locator block 130 against the bias of the spring 134. At maximum retraction, the locator block 130 "bottoms out" against the opposed side of the stationary base 124. This fully retracted position corresponds to the MMC of the component-receiving pocket 138.

Figure 3A:
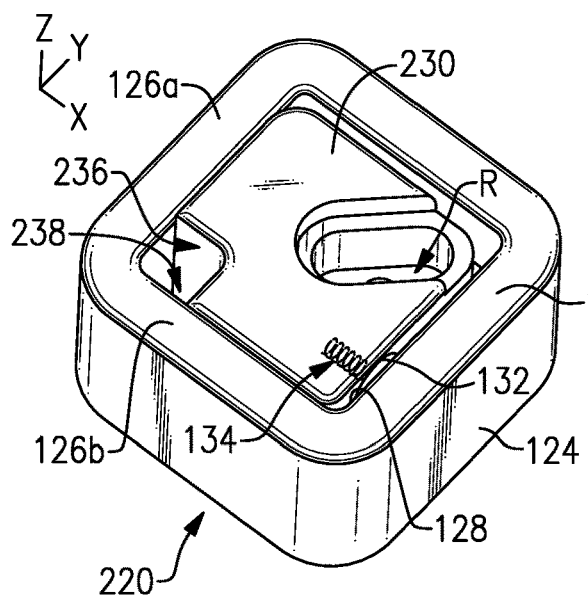
FIGS. 3A and 3B illustrate an example four-way locator mechanism.
Figure 3B:
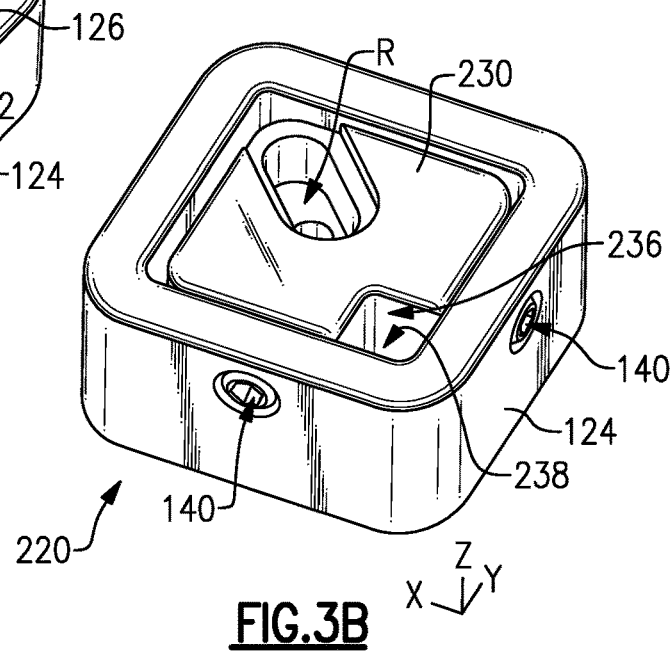

FIGS. 3A and 3B illustrate another example of a locator mechanism 220 that is somewhat similar to locator mechanism 120 but limits movement in four directions. In this example, the locator block 230 includes a recess 236 that faces toward a corner of the pocket 128 of the stationary base 124. The recess 236, with the sides 126a and 126b of the stationary base 124 form the component-receiving pocket 238. The locator block 230 is moveable diagonally along the opening R. That is, the bias force of the spring 134 is applied along the x-axis direction, but the retainer bolt (not shown) and opening R redirect the bias force in the diagonal direction so that the component will bear against the corner where sides 126a/126b meet. In this example, the locator block 230 limits movement in four ways, along the x-axis directions and along the y-axis directions.

Figure 4A:
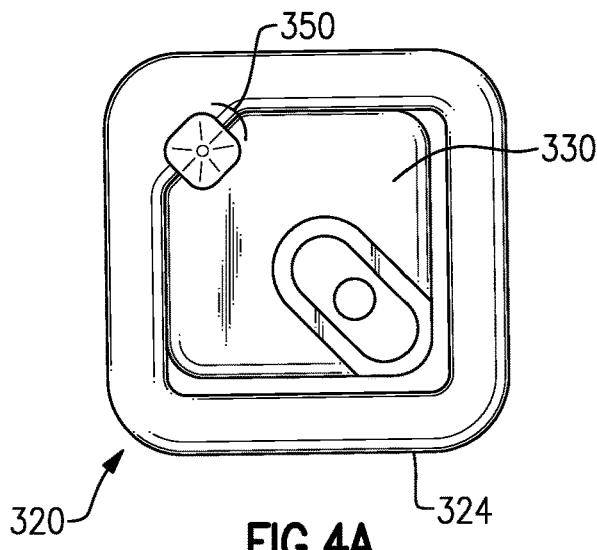
FIGS. 4A and 4B illustrate an example of a locator mechanism that has a component-receiving pin.
Figure 4B:
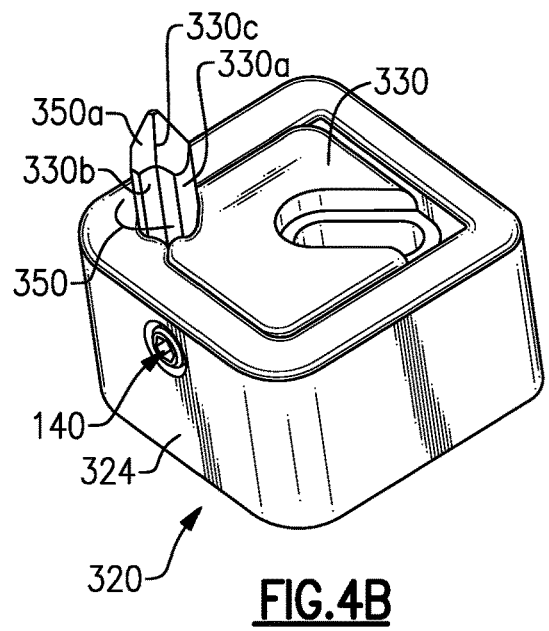

FIGS. 4A and 4B illustrate another example locator mechanism 320. In this example, rather than forming a component-receiving pocket, the stationary base 324 and the locator block 330 form a component-receiving pin 350. Here, the locator block 330 includes a first portion 330a of the pin 350 and the stationary base 324 includes a second portion 330b of the pin 350. When brought together, the portions 330a/330b meet at a parting line 330c. A hole of a component can then be received onto the pin 350, assuming the hole does not exceed the size of the pin 350, which may correspond to a MMC of the hole. In this example, the locator block 330 may be biased to depart from the portion 330b of the pin 350 on the stationary base 324. Thus, when placing the hole onto the pin 350, the portions 330a/330b are forced together against the bias force and also reduce play in the position of the component.

Figure 5:
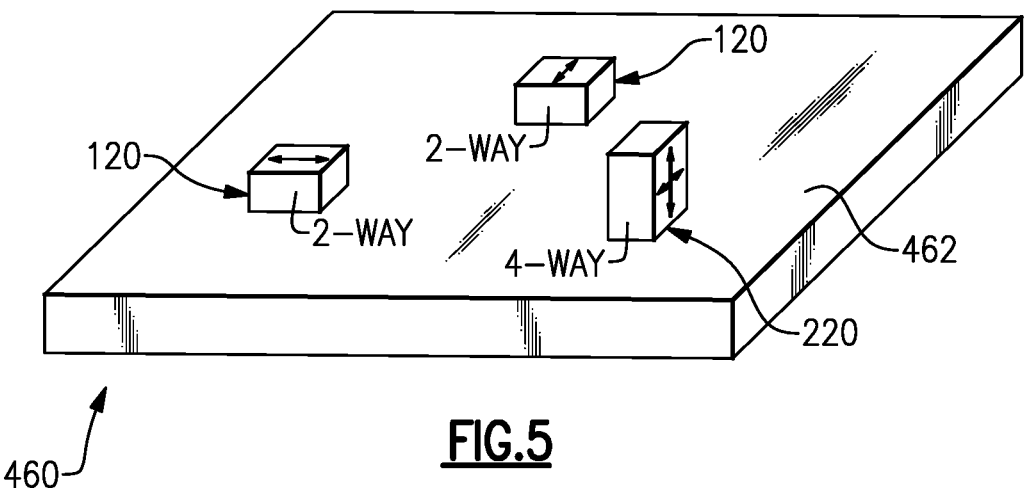
FIG. 5 illustrates a locator fixture system for checking dimensions of a component.

FIG. 5 schematically illustrates a locator fixture system 460 for checking dimensions of a component. The system 460 includes a plurality of locator mechanisms as described above. For example, the locator mechanisms include one of the four-way locator mechanisms 220 or one of the locator mechanisms 320 and two of the two-way locator mechanisms 120. Of course, other combinations are also possible. The mechanisms 120/220 are mounted on a fixture 462. In this example, the two directions of each of the two-way locators 120 are in a different plane (horizontal plane) than the four directions of the four-way locator 220 (vertical plane).

Figure 6:
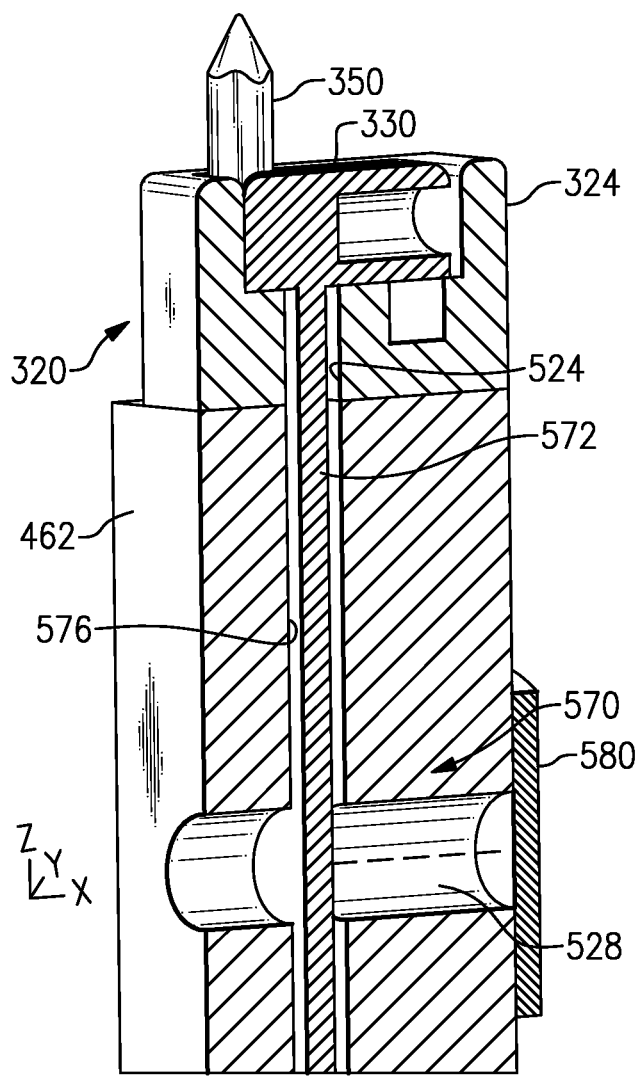
FIG. 6 illustrates the locator mechanism of FIG. 4A but with an indicator.

FIG. 6 illustrates a further example of the locator mechanism 320. In this example, the locator mechanism includes an indicator 570. The indicator 570 includes a rod 572 that is attached with the locator block 330. The rod 572 extends through an opening 574 in the stationary base 324 and continue through an opening 576 in the fixture 462. The fixture also include a port 578 by which a measurement device 580 accesses the rod 572 to measure its position. For instance, the measurement device 580 is a mechanical measurement device, such as a meter, or an electronic device such as a proximity sensor. Since the rod 572 moves with the locator block 330, the position of the rod 572 corresponds to the position of the locator block 330. The position of the locator block 330 can, in turn, be used to determine size information about the component feature (here, a hole). Moreover, the position of the rod 572 may be taken in two directions (e.g., the x-axis direction and the y-axis direction) for a four-way locator mechanism or in only one direction for a two-way locator mechanism.

As shown in numerous ones of the figures, the locator mechanisms 120/220/320 may have additional features that help to reduce the potential for damaging the components. For instance, as shown in FIG. 2A, the locator block 130 has beveled edges 130a along the recess 136. The beveled edges 130a facilitate guiding the component into the component-receiving pocket 138 and also reduce denting or slicing of the component surface. Likewise, the pin 350 of the locator mechanism 320 may also have a beveled edge 350a for guiding the hole of the component onto the pin 360 and reducing damage.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A locator mechanism for checking dimensions of a component, comprising:
    a stationary base including sides that define a pocket that opens upwards;
    a locator block disposed in, and moveable in, the pocket; and
    at least one spring biasing the locator block toward one of the sides of the stationary base, wherein the locator block is carrying either a recess or a portion of a pin for engaging, respectively, either a boss or a hole of a component to be checked, the spring biasing the locator block, and thus also the component, toward the one side of the stationary base to remove play in positioning of the component.

2. The locator mechanism as recited in claim 1, wherein the locator block is carrying the recess, and the recess opens toward the one side to form a component-receiving pocket there with.

3. The locator mechanism as recited in claim 2, wherein the component-receiving pocket is elongated and allows movement of the component in the elongated direction.

4. The locator mechanism as recited in claim 1, wherein the locator block is carrying the portion of the pin, and the stationary base includes a corresponding portion of a pin such that together the portions of the pins form a component-receiving pin for engaging the hole of the component.

5. The locator mechanism as recited in claim 1, further comprising a lock which, when engaged, retains the locator block in a retracted position.

6. The locator mechanism as recited in claim 5, wherein the lock includes a screw.

7. The locator mechanism as recited in claim 1, further comprising an indicator which indicates the position of the locator block.

8. The locator mechanism as recited in claim 7, wherein the indicator includes an opening in the stationary base and a rod on the locator block that extends through the opening, the rod being moveable in the opening with movement of the locator block to indicate position of the locator block.

9. The locator mechanism as recited in claim 7, wherein the indicator is electronic.

10. The locator mechanism as recited in claim 1, wherein the recess or the pin has a beveled edge guiding engagement of the component.

11. The locator mechanism as recited in claim 1, wherein the locator block includes a spring pocket in which the spring is disposed.

12. A locator fixture system for checking dimensions of a component, comprising:
a fixture; and
a plurality of locator mechanisms mounted on the fixture, each locator mechanism including,
a stationary base including sides that define a pocket that opens upwards,
a locator block disposed in, and moveable in, the pocket, and
at least one spring biasing the locator block toward one of the sides of the stationary base, wherein the locator block is carrying either a recess or a portion of a pin for engaging, respectively, either a boss or a hole of a component to be checked, the spring biasing the locator block, and thus also the component, toward the one side of the stationary base to remove play in positioning of the component.

13. The system as recited in claim 12, wherein each of the locator mechanisms is either a 2-way locator that limits movement of the engaged component two directions or a four-way locator that limits movement of the engaged component in four directions, and at least one of the locator mechanisms is a two-way locator and at least one other of the locator mechanisms is a four-way locator.

14. The system as recited in claim 13, wherein the two directions of the two-way locator are in a different plane than the four directions of the four-way locator.

15. The system as recited in claim 13, wherein the locator block of at least one of the locator mechanisms is carrying the recess, and the recess opens toward the one side to form a component-receiving pocket there with.

16. The system as recited in claim 15, wherein the component-receiving pocket is elongated and allows movement of the component in the elongated direction.

17. The system as recited in claim 13, wherein the locator block of at least one of the locator mechanisms is carrying the portion of the pin, and the stationary base includes a corresponding portion of a pin such that together the portions of the pins form a component-receiving pin for engaging the boss of the component.

18. The system as recited in claim 13, wherein at least one of the locator mechanisms includes a lock which, when engaged, retains the locator block in a retracted position.

* * * * *